United States Patent
Hu

(10) Patent No.: US 6,648,680 B1
(45) Date of Patent: Nov. 18, 2003

(54) STACKED ELECTRICAL CARD CONNECTOR ASSEMBLY

(75) Inventor: Suower Hu, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/323,158

(22) Filed: Dec. 19, 2002

(30) Foreign Application Priority Data

Jun. 6, 2002 (TW) ...................................... 91208388 U

(51) Int. Cl.$^7$ .............................................. H01R 12/00
(52) U.S. Cl. ................................... 439/541.5; 439/567
(58) Field of Search .......................... 439/541.5, 567, 439/571, 572, 108, 95, 92

(56) References Cited

U.S. PATENT DOCUMENTS

| | | | | |
|---|---|---|---|---|
| 5,399,105 A | * | 3/1995 | Kaufman et al. ........... 439/609 |
| 5,490,791 A | * | 2/1996 | Yamada et al. ............. 439/159 |
| 5,591,047 A | * | 1/1997 | Yamada et al. .......... 439/541.5 |
| 6,059,586 A | * | 5/2000 | Watanabe et al. ........... 439/159 |
| 6,068,510 A | * | 5/2000 | Tung ........................... 439/567 |
| 6,106,331 A | * | 8/2000 | Kurotori et al. ............. 439/567 |
| 6,132,243 A | * | 10/2000 | Hirata et al. ............. 439/541.5 |
| 6,146,193 A | * | 11/2000 | Yu ........................... 439/541.5 |
| 6,146,195 A | * | 11/2000 | Chang ..................... 439/541.5 |
| 6,174,197 B1 | * | 1/2001 | Hirata et al. ............. 439/541.5 |
| 6,390,832 B1 | * | 5/2002 | Kuo ........................... 439/101 |

* cited by examiner

Primary Examiner—Ross Gushi
(74) Attorney, Agent, or Firm—Wei Te Chung

(57) ABSTRACT

A stacked electrical card connector assembly (1) includes a first electrical card connector (2), a second electrical card connector (3), a pair of boardlocks (4), and a pair of grounding members (5). The boardlocks engagingly stack the two electrical card connectors together, and protrude below the second electrical card connector for fixing to a PCB. The boardlocks thus securely fix the two electrical card connectors to the PCB.

7 Claims, 4 Drawing Sheets

STACKED ELECTRICAL CARD CONNECTOR ASSEMBLY

BACKGROUND OF THE INVENTION

1. Field of the Invention

The present invention relates to electrical connector assemblies, and particularly to stacked electrical card connector assemblies with multi-function boardlocks.

2. Description of the Related Art

A conventional electrical card connector, as disclosed in U.S. Pat. Nos. 6,095,864, 6,135,792 and 6,352,438 and Taiwan Patent Issue Nos. 238005, 244032 and 244643, is designed to receive a single electrical card. The electrical card connector is mounted on a printed circuit board (PCB) for electrically connecting the electrical card received therein with an electrical circuit of the PCB. The electrical card connector usually has boardlocks which mechanically fasten the electrical card connector on the PCB. More details about this kind of electrical card connector can be found in Memory Card Connector (Connector Specifier, pp. 40–42, February 1998).

Due to continuing trends toward miniaturization and improved electrical performance in the electronics industry, requirements for smaller components and higher electrical speeds are constantly being promulgated. Electrical card connectors such as the one mentioned above need to be made more compact, in order to save space in electronic devices in which these connectors are to be installed. In addition, more than one electrical card is needed inside certain electronic devices, to provide more functions for the device or to provide for transferring and saving of information. Each additional electrical card needed requires a corresponding additional electrical card connector. The simplest way to provide a plurality of electrical card connectors in a limited space is to stack the electrical card connectors on top of each other. However, each electrical card connector has a separate boardlock used to fasten the electrical card connector firmly on the PCB. The electrical card connector assembly generally needs another element to fix the two electrical card connectors together. As a result, it is unduly complicated and inconvenient to assemble the two electrical connectors and mount them on the PCB.

Hence, a new electrical card connector assembly with multi-function boardlocks that overcomes the above-mentioned problems is desired.

SUMMARY OF THE INVENTION

An object of the present invention is to provide an electrical card connector assembly having multi-function boardlocks which stack two or more electrical card connectors together and fasten them firmly on a PCB.

To achieve the above-mentioned object, a stacked electrical card connector assembly in accordance with a preferred embodiment of the present invention comprises a first electrical card connector, a second electrical card connector, a pair of boardlocks and a pair of grounding members. The boardlocks engagingly stack the two electrical card connectors together, and protrude below the second electrical card connector for fixing to a PCB. The boardlocks thus securely fix the two electrical card connectors to the PCB.

Other objects, advantages and novel features of the present invention will become more apparent from the following detailed description when taken in conjunction with the accompanying drawings, in which:

DESCRIPTION OF THE PREFERRED EMBODIMENT

Figure 1:
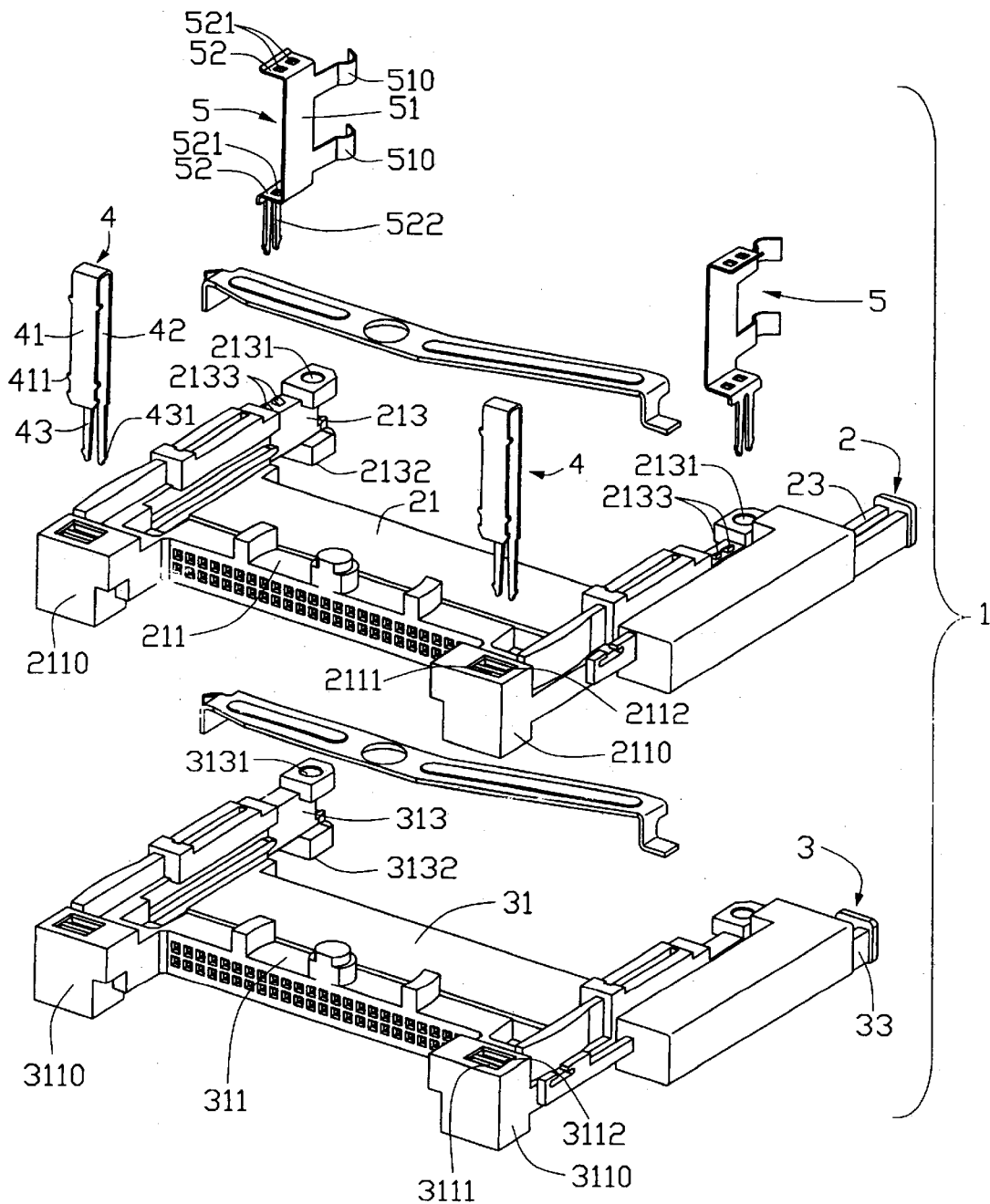
FIG. 1 is an exploded isometric view of a stacked electrical card connector assembly in accordance with a preferred embodiment of the present invention.

Reference will now be made to the drawing figures to describe the present invention in detail.

Figure 2:
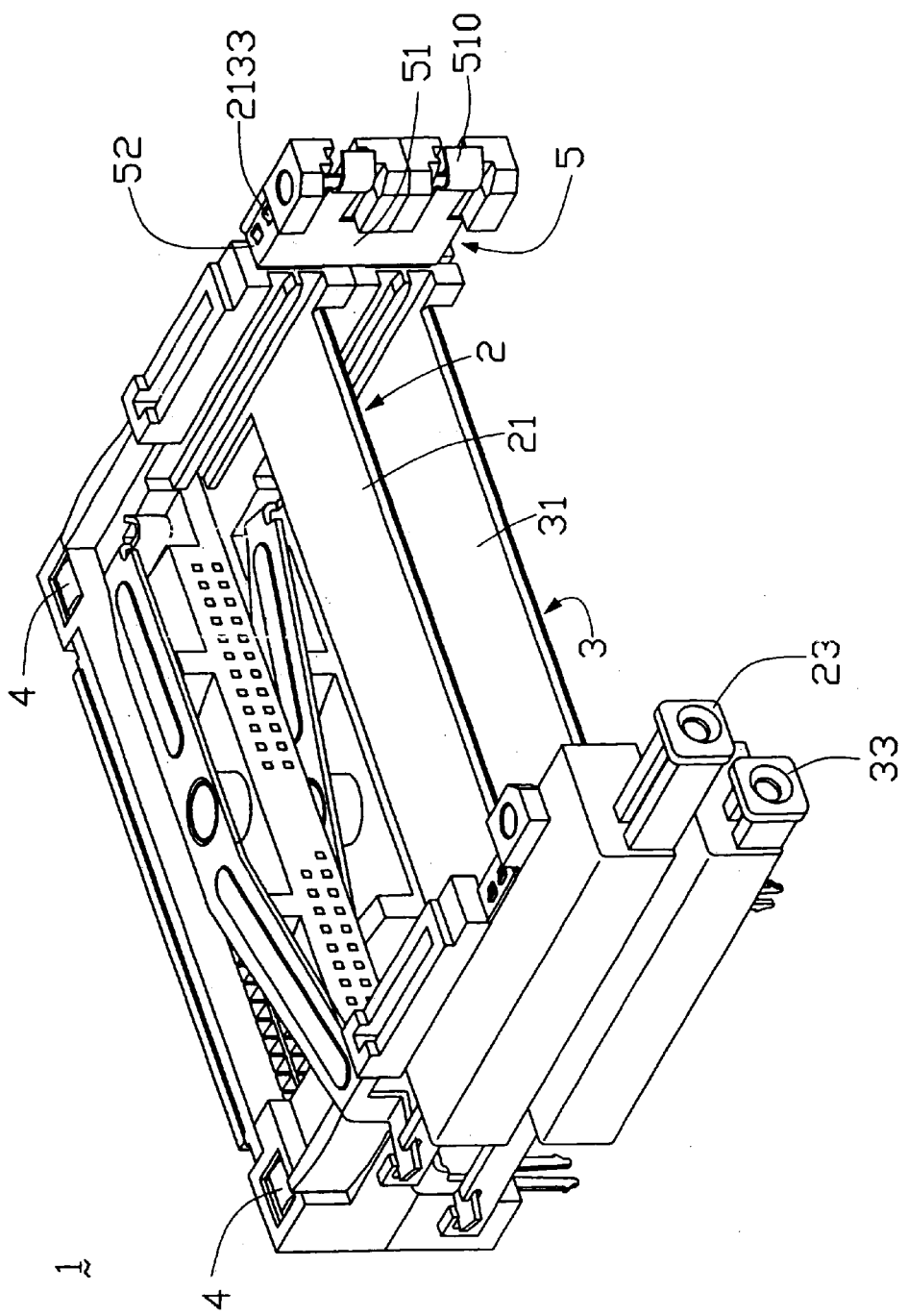
FIG. 2 is an isometric view of the stacked electrical card connector assembly of FIG. 1 fully assembled, but viewed from another aspect.
Figure 3:
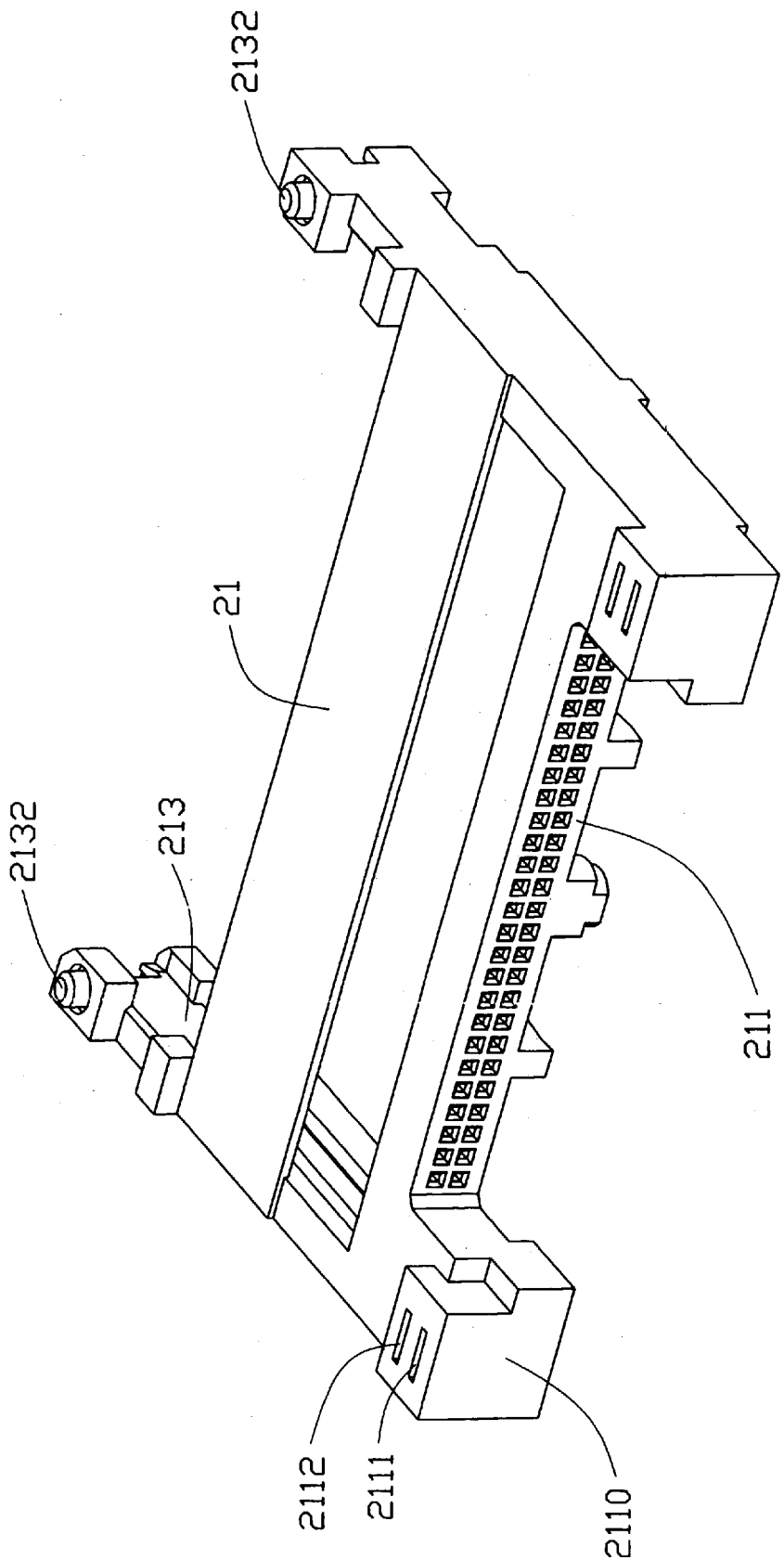
FIG. 3 is an enlarged, inverted view of a first electrical card or of the stacked electrical card connector assembly of FIG. 1.
Figure 4:
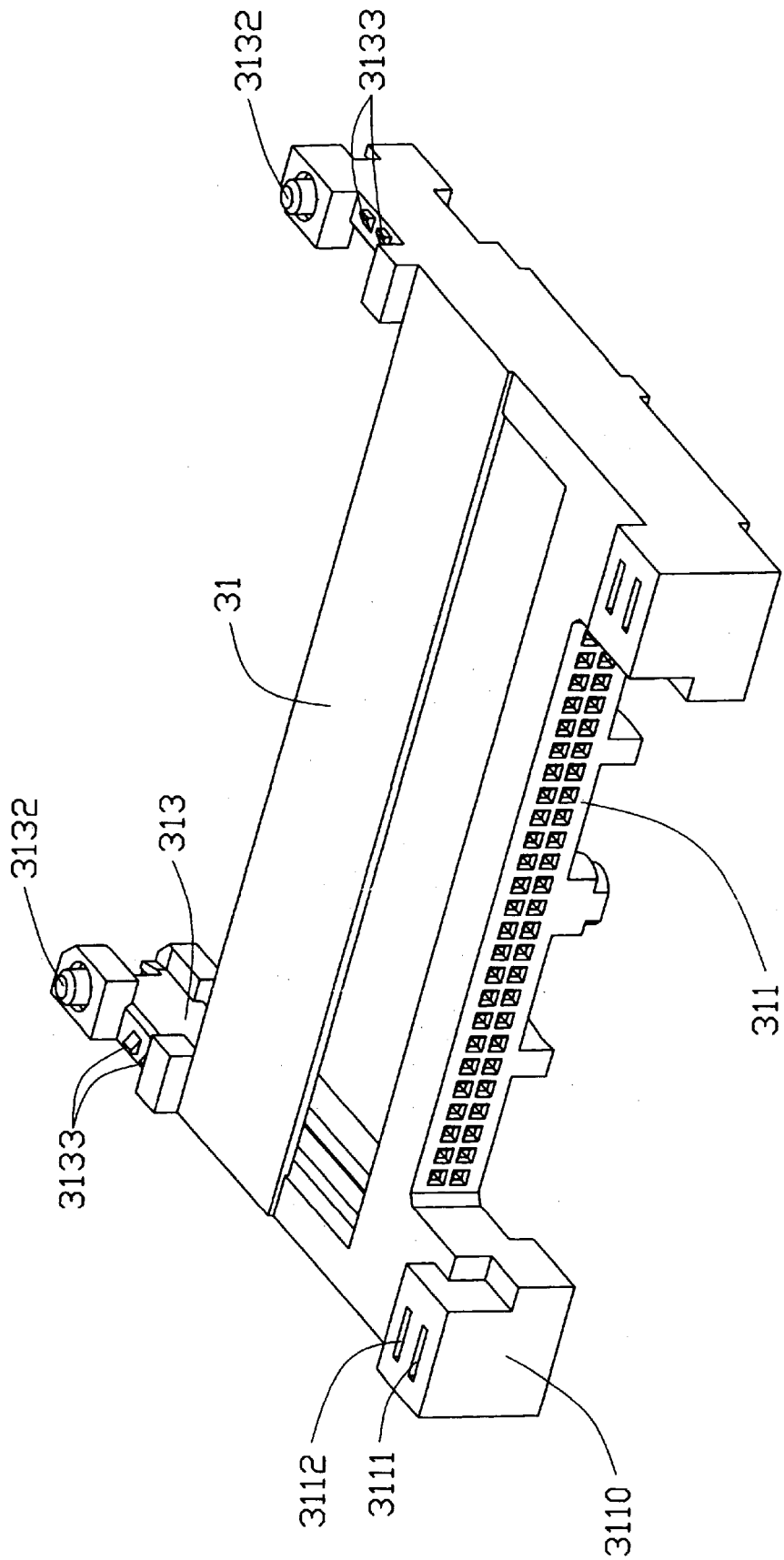
FIG. 4 is an enlarged, inverted view of a second electrical card or of the stacked electrical card connector assembly of FIG. 1.

Referring to FIGS. 1–4, an electrical card connector assembly 1 in accordance with a preferred embodiment of the present invention comprises a first electrical card connector 2, a second electrical card connector 3, a pair of boardlocks 4 and a pair of grounding members 5.

The first electrical card connector 2 comprises a first frame 21 and a first ejector 23. The first frame 21 comprises a first main portion 211, and a pair of parallel first cantilevers 213 extending from opposite ends of the first main portion 211 respectively. The first ejector 23 is movably attached to one of the first cantilevers 213. Each first cantilever 213 has a first post 2110 formed at an end thereof proximal to the first main portion 211. Each first post 2110 defines a rectangular first retaining hole 2111, and an adjacent rectangular first connecting hole 2112 therein. A circular first recess 2131 is defined in a top of an end of each first cantilever 213 that is distal from the first main portion 211. A first bulge 2132 is formed at a bottom of the distal end of each first cantilever 213. A configuration of the first bulge 2132 corresponds to a configuration of the first recess 2131. A pair of first protrusions 2133 is formed on the top of the distal end of each first cantilever 213, between the first recess 2131 and the first main portion 211 and near the first recess 2131.

The second electrical card connector 3 is similar to the first electrical card connector 2, and comprises a second frame 31 and a second ejector 33. The second frame 31 comprises a second main portion 311, and a pair of parallel second cantilevers 313 extending from opposite ends of the second main portion 311 respectively. The second ejector 33 is movably attached to one of the second cantilevers 313. Each second cantilever 313 has a second post 3110 formed at an end thereof proximal to the second main portion 311. Each second post 3110 defines a rectangular second retaining hole 3111 and an adjacent rectangular second connecting hole 3112 therein. A circular second recess 3131 is defined in a top of an end of each second cantilever 313 that is distal from the second main portion 311. A second bulge 3132 is formed at a bottom of the distal end of each second cantilever 313. A configuration of the second bulge 3132 corresponds to a configuration of the second recess 3131. A pair of second protrusions 3133 is formed on a bottom of the distal end of each second cantilever 313, between the second bulge 3132 and the second main portion 311 and near the second bulge 3132.

Each grounding member 5 comprises a base plate 51, a pair of parallel retention plates 52 extending perpendicularly from a top end and a bottom end of the base plate 51 respectively, and a pair of spaced spring arms 510 extending generally coplanarly from one main edge of the base plate 51. A pair of receiving holes 521 is defined in each retention plate 52. A forklike fastener 522 depends from a distal end of a bottommost of the retention plates 52.

Each boardlock 4 is elongated and generally U-shaped. The boardlock 4 comprises an elongate retention portion 41, an elongate connecting portion 42 parallel and opposite to the retention portion 41, and a forklike fastening portion 43 depending from the connecting portion 42. A plurality of first barbs 411 is formed on opposite side edges of the retention portion 41. A pair of second barbs 431 is formed at distal ends of the forklike fastening portion 43.

The first electrical card connector 2 is attached on the second electrical card connector 3. The first bulges 2132 of the first electrical card connector 2 are engagingly received in the second recesses 3131 of the second electrical card connector 3. This ensures precise positioning of the first electrical card connector 2 on the second electrical card connector 3. Accordingly, precise positioning of corresponding components of the first and second electrical card connectors 2, 3 is also ensured.

The boardlocks 4 are used for fixing the electrical card connector assembly 1 on the PCB (not shown). The retention portions 41 of the boardlocks 4 are received in the corresponding first retaining holes 2111 of the first electrical card connector 2 and the corresponding second retaining holes 3111 of the second electrical card connector 3. The first barbs 411 of the boardlocks 4 interferentially engage in the first and second retaining holes 2111, 3111. The connecting portions 42 of the boardlocks 4 are received in the corresponding first connecting holes 2112 of the first electrical card connector 2 and the corresponding second connecting holes 3112 of the second electrical card connector 3. The fastening portions 43 of the boardlocks 4 protrude below the second frame 31 of the second electrical card connector 3. The boardlocks 4 are then fixed to the PCB (not shown), with the second barbs 431 of the boardlocks 4 being engaged with the PCB (not shown). Thus the electrical card connector assembly 1 is securely fastened on the PCB by the boardlocks 4, and the first electrical card connector 2 and the second electrical card connector 3 are firmly fixed together also by the boardlocks 4.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

What is claimed is:

1. A stacked electrical card connector assembly for mounting on a circuit substrate, the stacked electrical card connector assembly comprising:
   a first electrical card connector comprising a first frame adapted to receive a first electrical card;
   a second electrical card connector in stacked engagement with the first electrical card connector, and comprising a second frame adapted to receive a second electrical card; and
   at least one boardlock comprising a retention portion, a fastening portion positioned parallel to the retention portion and a connecting portion adapted to connect the retention portion and the fastening portion;
   wherein the retention portion of the boardlock extends through the first frame of the first electrical card connector and the second frame of the second electrical card connector to fix the first and the second electrical card connectors together, and the fastening portion of the boardlock extends into the circuit substrate to fasten the stacked electrical card connector assembly thereon.

2. The stacked electrical card connector assembly as described in claim 1, wherein the first frame comprises a first main portion and two parallel first cantilevers extending from opposite ends of the first main portion, each first cantilever has a first post formed at an end thereof proximal to the first main portion, and each first post defines a first retaining hole and an adjacent first connecting hole therein.

3. The stacked electrical card connector assembly as described in claim 2, wherein the second frame comprises a second main portion and two parallel second cantilevers extending from opposite ends of the second main portion, each second cantilever has a second post formed at an end thereof proximal to the second main portion, and each second post defines a second retaining hole and an adjacent second connecting hole therein.

4. The stacked electrical card connector assembly as described in claim 3, wherein the stacked electrical card connector assembly comprises two boardlocks, the retention portion of each of the boardlocks is engagingly received in a corresponding first retaining hole and a corresponding second retaining hole, and the fastening portion of each of the boardlocks is received through a corresponding first connecting hole and a corresponding second connecting hole for extension into the circuit substrate.

5. The stacked electrical card connector assembly as described in claim 1, wherein the at least one boardlock is generally U-shaped, and the fastening portion thereof is forked.

6. A stacked electrical connector assembly comprising:
   a first card connector defining a first frame with a first space therein for receiving a first card therein;
   a second card connector stacked upon the first connector and defining a second frame with a second space therein for receiving a second card therein;
   a grounding member including first and second securing tabs fixed to the first and second frame, respectively, and first and second grounding tangs extending into the corresponding first and second spaces, respectively, for engagement with the corresponding first and second cards; wherein
   a fork-like fastener extends downwardly around a bottom portion of the grounding member beyond the first connector for latchable engagement with a printed circuit board on which said stacked first and second connectors are seated.

7. A stacked electrical connector assembly comprising:
   a first connector defining a first frame;
   a pair of first vertical slots defined in the first frame;
   a second connector stacked upon the first connector and defining a second frame;
   a pair of second slots defined in the second frame and vertically aligned with the first pair of slots, respectively; and
   a board lock being of generally a U-shaped configuration including first and second legs, each of said legs extending through the corresponding first and second slots of said first and second pairs of slots; wherein
   the first leg includes barbs respectively engage the first and second frames, respectively, and the second leg is free relative to the first and second frame in the corresponding first and second slots while extending downwardly beyond the first connector with projections for latchable engagement with a printed circuit board on which the stacked first and second connectors are seated.

* * * * *